(12) United States Patent
Liguori et al.

(10) Patent No.: US 7,999,047 B2
(45) Date of Patent: Aug. 16, 2011

(54) MAGNESIUM METHOXIDE BASED CATALYST PRECURSORS AND CATALYST COMPONENTS OBTAINED THEREFROM

(75) Inventors: Dario Liguori, Forino (IT); Giampiero Morini, Padua (IT)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 12/311,079

(22) PCT Filed: Sep. 18, 2007

(86) PCT No.: PCT/EP2007/059847
§ 371 (c)(1),
(2), (4) Date: Mar. 18, 2009

(87) PCT Pub. No.: WO2008/037630
PCT Pub. Date: Apr. 3, 2008

(65) Prior Publication Data
US 2009/0240009 A1 Sep. 24, 2009

(30) Foreign Application Priority Data
Sep. 25, 2006 (EP) .................................... 06121195

(51) Int. Cl.
*C08F 4/50* (2006.01)
(52) U.S. Cl. .................................................. 526/124.3
(58) Field of Classification Search ................ 526/124.3
See application file for complete search history.

(56) References Cited

U.S. PATENT DOCUMENTS

| 4,220,554 | A | * | 9/1980 | Scata et al. ..................... 502/119 |
| 4,298,718 | A | | 11/1981 | Mayr et al. |
| 4,806,696 | A | * | 2/1989 | Job ............................... 568/851 |
| 4,876,230 | A | | 10/1989 | Job |
| 6,127,304 | A | | 10/2000 | Sacchetti et al. |
| 6,323,152 | B1 | | 11/2001 | Sacchetti et al. |
| 6,407,028 | B1 | | 6/2002 | Sacchetti et al. |
| 6,437,061 | B1 | | 8/2002 | Sacchetti et al. |
| 6,686,307 | B2 | | 2/2004 | Sacchetti et al. |
| 2004/0053774 | A1 | * | 3/2004 | Yang et al. ..................... 502/102 |
| 2007/0097784 | A1 | | 5/2007 | Arletti et al. |

FOREIGN PATENT DOCUMENTS

| EP | 360454 | 3/1990 |
| WO | 98/44009 | 10/1998 |
| WO | 2005/039745 | 5/2005 |
| WO | 2007/147714 | 12/2007 |

* cited by examiner

*Primary Examiner* — Ling-Siu Choi
*Assistant Examiner* — Sonya Wright
(74) *Attorney, Agent, or Firm* — Dilworth IP, LLC

(57) ABSTRACT

Catalyst precursors comprising Mg, Ti, OMe and OR groups that are in molar ratios defined by the formula $MgTi_n(OMe)_{(p)}(OR)_x$ in which n is from 0.1 to 1, p is $\geq (2+4n)$, x is from 0 to 1 and R is C2-C15 hydrocarbon groups can be easily transformed, with high yields, in solid catalyst components to be advantageously used in the polymerization of both ethylene and alpha olefins.

6 Claims, No Drawings

MAGNESIUM METHOXIDE BASED CATALYST PRECURSORS AND CATALYST COMPONENTS OBTAINED THEREFROM

The present invention relates to catalyst precursor comprising compounds including at least a magnesium and titanium methoxy compounds in specific amounts. The precursors of the present invention are particularly useful as for the preparation of Ziegler-Natta catalyst components for the polymerization of olefins.

The modern ZN catalysts including titanium compounds supported on magnesium halides are well known in the art. Catalysts of this type are described in the U.S. Pat. No. 4,298,718. Said catalysts, which generally comprise titanium halides compounds supported on halides of magnesium, can be prepared by different synthetic routes whose complexity can vary. One of the routes that gives catalyst with high activity comprises the reaction between titanium halides and precursors of formula $MgCl_2(ROH)_n$ where R is a C1-C10 alkyl group preferably, ethyl, and n is from 2 to 6 such as those described in WO98/44009. However, when a precursor of this type is reacted with the titanium compound, usually $TiCl_4$, a large amount of hydrochloric acid evolves, which must be neutralized and removed. Moreover, it has to be considered that the yield of such a support is not particularly high. For example the amount of final catalyst obtained generally contains $MgCl_2$ in an amount which is only about 40% by weight of the amount of the starting support considering an n value of about 3. Another disadvantage of this route consists in the fact that it is difficult to obtain the precursors with a narrow particle size distribution particularly when combined with small average particle size. To this purpose, specific and complex devices such as those described in WO2005/039745.

Precursors that do not generate hydrogen chloride and that yield higher proportions of final catalysts are for example those disclosed in U.S. Pat. No. 4,220,554 that are of general formula $MgX_n(OR)_{2-n}$. Moreover, these precursors are able to generate a final catalyst characterized by a narrow particle size distribution even when the catalyst particles have small average diameter such as below 50 µm. One problem associated with this kind of precursor however was due to the not particularly high polymerization activity (in terms of amount of polymer per g of catalyst component per hour) in the ethylene polymerization. Moreover, when used in propylene polymerization, the activity is low if they are prepared in the presence of 1,3-diether based catalysts.

The applicant has now found novel precursors that can be easily transformed, with high yields, in solid catalyst components to be advantageously used in the polymerization of both ethylene and alpha olefins.

The said catalyst precursors comprising Mg, Ti OMe and OR groups that are in molar ratios defined by the formula $MgTi_n(OMe)_{(p)}(OR)_x$ in which n is from 0.1 to 1, p is $\geq(2+4n)$, x is from 0 to 1 and R is C2-C15 hydrocarbon groups.

Preferably, n is from 0.2 to 0.8 more preferably from 0.3 to 0.7.

In a preferred embodiment p is >2+4n and more preferably is higher than 2.5+4n.

X is preferably lower than 0.5 and more preferably lower than 0.45 and especially it ranges from 0 to 0.3.

R is preferably selected from C2-C10 linear or branched alkyl groups and in particular from C2-C8 linear alkyl groups. Among them, ethyl, propyl, n-butyl, isobutyl, sec butyl and t-butyl are preferred. Ethyl is especially preferred.

The precursors of the present invention can be prepared according to several methods. One of the preferred methods comprises dissolving metallic Mg in an excess of methanol with the optional presence of suitable inert medium. The inert medium is suitably selected among liquids, preferably organic, which are inert to the reactants mentioned above. Preferably they are selected among hydrocarbon liquid media, possibly halogenated, commonly used in the practice. Examples are hexane, heptane, liquid paraffins, benzene, toluene, Cl-Benzene. The reaction temperature is not particularly critical and can range from temperatures below zero up to the boiling point of the methanol or even higher. Good results have been obtained in the range from 0 to 150° C. and in particular operating at room temperature. The so obtained solution is then added with a $Ti(OR)_4$ compound, kept under stirring, so that precipitation of the precursor of the above mentioned formula takes place.

Usually, the molar ratios among the titanium compound and Mg used as starting component already reflect those found on the final solid. Therefore, the Ti compound is preferably used in molar ratios, with respect to the Mg compound, indicated above. As a variation of the said method, $Mg(OR)_2$, and particularly $Mg(OEt)_2$ can be used as a starting material instead of metallic Mg. If desired also additional components facilitating the formation of a solution can be used. Usually they are selected among Lewis bases such as ethers or esters. Among them, aliphatic ethers possibly cyclic like tetrahydrofurane are preferred.

In the above methods, the control of the particle size distribution can be obtained to a large extent by properly operating the stirring speed in the reactor. While the geometry of the reactor plays a minor role, in general higher stirring speed allows the precipitation of the catalyst precursor with a lower particle size and in particular in the range from 1 to 40 and more specifically in the range 2-30 µm. It is important to note that the particle size distribution (SPAN) associated with this small particle size is lower than 1.3, preferably lower than 1.1, and more preferably ranging from 0.7 to 0.9.

Regardless of the preparation method the precursors of the invention can, as such, already be used, in combination with an organo Al-compound preferably halogenated, in the polymerization of olefins and in particular of ethylene optionally in mixtures with alpha-olefins. Moreover, as mentioned above, these precursors can be advantageously used in the preparation of catalyst components for the polymerization of olefins. The said catalyst components can be obtained by contacting the precursors of the invention with compounds having halogenating capability. Among them the preferred are halogenated organo-Al compounds and fully or partially halogenated transition metals belonging to one of the groups 4 to 6 of the Periodic Table of Elements (new notation). Among transition metal compounds particularly preferred are titanium compounds of formula $Ti(OR)_n X_{y-n}$ in which n is comprised between 0 and 3; y is the valence of titanium; X is halogen and R is an alkyl radical having 1-10 carbon atoms or a COR group. Among them, particularly preferred are titanium tetrahalides or trihalogenalcoholates. Preferred specific titanium compounds are $TiCl_3$, $TiCl_4$, $Ti(OBu)Cl_3$, $Ti(OBu)_2Cl_2$. Preferably the contact is carried out by suspending the precursor in cold $TiCl_4$ (generally 0° C.); then the so obtained mixture is heated up to 30-130° C. and kept at this temperature for 0.1-2 hours. After that the excess of $TiCl_4$ is removed and the solid component is recovered. The treatment with $TiCl_4$ can be carried out one or more times. For the use in the preparation of a sterespecific catalyst component also a steromodulating electron donor compound can be added to the solid catalyst component. The introduction of the electron donor can be done simultaneously with the reaction between transition metal compound and the precursor. When an internal donor is used, the maximum titanation temperature is preferably higher than 80° C. As a result of this contact the electron donor compound normally remains deposited on the catalyst component. Said electron donor compound can be selected from esters of mono or bicarboxylic acids, ethers, amines, and ketones. Particularly preferred is the use of 1,3-diethers of formula (I)

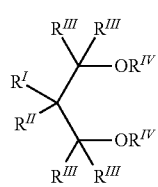

(I)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si. Suitable electron donors are also the alkyl and aryl esters of mono- or polycarboxylic acids, preferably for example esters of benzoic, phthalic, malonic, glutaric and succinic acids. Specific examples of such esters are di-n-butyl phthalate, diisobutyl phthalate, di-n-octyl phthalate, diethyl 2,3-diisopropylsuccinate, diethyl 2,3-dicyclohexylsuccinate, ethyl benzoate and ethyl p-ethoxybenzoate.

The electron donor compound used in the preparation of the catalyst generally ranges, in molar ratios with respect to the magnesium, from 1:2 to 1:20.

The solid catalyst components according to the present invention may show a surface area (by B.E.T. method) generally between 10 and 500 $m^2/g$ and preferably between 20 and 350 $m^2/g$.

The catalyst components of the invention form catalysts for the polymerization of alpha-olefins $CH_2$=CHR, wherein R is hydrogen or a hydrocarbon radical having 1-12 carbon atoms, by reaction or contact with organo-Al compounds in particular Al-alkyl compounds. The alkyl-Al compound is preferably chosen among the trialkyl aluminum compounds such as for example triethylaluminum (TEAL), triisobutylaluminum (TIBAL), tri-n-butylaluminum, tri-n-hexylaluminum, tri-n-octylaluminum. Particularly in the ethylene(co)polymerization, it is preferred to use alkylaluminum halides, alkylaluminum hydrides or alkylaluminum sesquichlorides such as $AlEt_2Cl$ and $Al_2Et_3Cl_3$ more preferably in mixture with said trialkylaluminum compounds. Specific mixtures TEAL/DEAC in various ratios are preferred. The total Al/Ti ratio is higher than 1 and is generally comprised between 20 and 800.

In the case of the stereoregular polymerization of α-olefins, such as for example propylene and 1-butene, an electron donor compound (external donor) which can be the same or different from the compound used as internal donor can be used in the preparation of the catalysts disclosed above. In case the internal donor is an ester of a polycarboxylic acid, in particular a phthalate, the external donor is preferably selected from the silane compounds containing at least a Si—OR link, having the formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, and dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the 1,3-diethers having the previously described formula can be used as external donor. However, in the case 1,3-diethers are used as internal donors, the use of an external donor could be avoided, as the stereospecificity of the catalyst is already sufficiently high for polymers to be used in various applications.

As previously indicated, the components of the invention and catalysts obtained therefrom find applications in the processes for the (co)polymerization of olefins of formula $CH_2$=CHR in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

The following examples are given to illustrate and not to limit the invention itself.

Characterization

Determination of X.I.

2.50 g of polymer were dissolved in 250 ml of o-xylene under stirring at 135° C. for 30 minutes, then the solution was cooled to 25° C. and after 30 minutes the insoluble polymer was filtered off. The resulting solution was evaporated in nitrogen flow and the residue was dried and weighed to determine the percentage of soluble polymer and then, by difference, the xylene insoluble fraction (%).

Particle Size Distribution (Span)

According to the present invention the particle size distribution is calculated with the formula $$\frac{P90 - P10}{P50}$$

where, in a particle size distribution curve, P90 is the value of the diameter such that 90% of the total particles have a diameter lower than that value; P10 is the value of the diameter such that 10% of the total particles have a diameter lower than that value and P50 is the value of the diameter such that 50% of the total particles have a diameter lower than that value.

Particle Size of the Catalyst (P90; P10 P50)

Determined by a method based on the principle of the optical diffraction of monochromatic laser light with the "Malvern Instr. 2600" apparatus. The average size is given as P50.

Melt Index: measured at 190° C. according to ASTM D-1238 condition "L"

Intrinsic viscosity: determined in tetrahydronaphthalene at 135° C.

Determination of Ti, Mg, Cl: has been carried out via potentiometric titration.

Determination of alkoxides (as ROH): via Gas-Chromatography analysis after hydrolysis of the catalyst.

Comonomer Content

1-Butene or α-olefins were determined via Infrared Spectrometry.

Effective density: ASTM-D 1505

EXAMPLES

General Procedure for Polymerization of Propylene Without External Donor (Procedure I)

In a 4 L autoclave, purged with a nitrogen flow at 70° C. for 2 h, 75 mL of anhydrous hexane containing 600 mg of AlEt$_3$ and 6.00 mg of solid catalyst prepared as described above were introduced in propylene flow at 30° C. The autoclave was closed. At the same temperature 1.2 NL of hydrogen were added and then, under stirring, 1.2 Kg of liquid propylene were fed. The temperature was raised to 70° C. in five minutes and the polymerization was carried out at this temperature for 2 h. After that, the non-reacted propylene was removed, the formed polymer was collected, dried at 70° C. under vacuum for 3 h, then weighted and analyzed for the amount of present Mg residues, based on which the activity of the catalyst was calculated.

General Procedure for Polymerization of Propylene with External Donor (Procedure II)

In a 4 L autoclave, purged with a nitrogen flow at 70° C. for 2 h, 75 mL of anhydrous hexane containing 760 mg of AlEt$_3$, 63.0 mg of dicyclopentyldimethoxysilane and 10.0 mg of solid catalyst prepared as described above were introduced in propylene flow at 30° C. The autoclave was closed. At the same temperature 2.0 NL of hydrogen were added and then, under stirring, 1.2 Kg of liquid propylene were fed. The temperature was raised to 70° C. in five minutes and the polymerization was carried out at this temperature for 2 h. After that, the non-reacted propylene was removed, the formed polymer was collected, dried at 70° C. under vacuum for 3 h, then weighted and analyzed for the amount of present Mg residues, based on which the activity of the catalyst was calculated.

General Procedure for Homopolymerization of Ethylene (Procedure A)

A 4.5 liter stainless-steel autoclave equipped with a stirrer, temperature and pressure indicator, feeding line for hexane, ethylene, and hydrogen, was used and purified by fluxing pure nitrogen at 70° C. for 60 minutes. Then, 1550 cm$^3$ of hexane containing 4.9 cm$^3$ of 10% by wt/vol TEA/DEAC 2:1 hexane solution, was introduced at a temperature of 30° C. under nitrogen flow. In a separate 200 cm$^3$ round bottom glass bottle were successively introduced, 50 cm$^3$ of anhydrous hexane, 1 cm$^3$ of 10% by wt/vol, TEA/DEAC 2:1 (wt:wt) hexane solution and about 0.010÷0.025 g of the solid catalyst of table 1. They were mixed together, aged 10 minutes at room temperature and introduced under nitrogen flow into the reactor. The autoclave was closed, then the temperature was raised to 85° C., hydrogen (partial pressure as indicated in table 2) and ethylene (7.0 bars partial pressure) were added.

Under continuous stirring, the total pressure was maintained at 85° C. for 120 minutes by feeding ethylene. At the end the reactor was depressurised and the temperature was dropped to 30° C. The recovered polymer was dried at 70° C. under a nitrogen flow.

General Procedure for Homopolymerization of Ethylene (Procedure B)

The procedure is the same as Procedure (A) with the difference that TIBAL is used instead of TEA/DEAC mixture.

General procedure for Homopolymerization of Ethylene (Procedure C)

The procedure is the same as Procedure (A) with the difference that TIBAL is used instead of TEA.

General Procedure for the Copolymerization of Ethylene

A 4.5 liter stainless-steel autoclave equipped with a stirrer, temperature, pressure indicator, feeding line for ethylene, propane, 1-butene, hydrogen, and a steel vial for the injection of the catalyst, was purified by fluxing pure nitrogen at 70° C. for 60 minutes. It was then washed with propane, heated to 75° C. and finally loaded with 800 g of propane, 1-butene (the amount reported in table 3), ethylene (7.0 bar, partial pressure) and hydrogen (as in table 3).

In a 100 cm$^3$ three neck glass flask were introduced in the following order, 50 cm$^3$ of anhydrous hexane, the TEAL/DEAC 50:50 molar hexane solution the external electron donor compound (Tetrahydrofurane Al/THF molar ratio 5) and the solid catalyst (0.005-0.015 g). They were mixed together and stirred at room temperature for 5 minutes and then introduced in the reactor through the steel vial by using a nitrogen overpressure.

Under continuous stirring, the total pressure was maintained constant at 75° C. for 60 minutes by feeding ethylene. At the end the reactor was depressurized and the temperature was dropped to 30° C. The recovered polymer was dried at 70° C. under a nitrogen flow and weighted.

Example 1

To a four-necked flask with a stirrer, a reflux-cooler and a thermometer, kept in a inert gas atmosphere and containing 0.42 mol of MgOEt$_2$, were slowly added, in sequence, 0.337 mol of THF(27.3 ml) and 200 ml of MeOH (4.95 mol). The mixture was stirred at 25° C. for 1 h to obtain a solution.

At this point, 0.17 mol of Ti(OEt)$_4$ was slowly added to the above prepared solution in about 20 minutes, while maintaining the stirring speed at 800 rpm and observing the MgOEt$_2$ solution becoming opalescent with the formation of a precipitate. At the end of Ti(OEt)$_4$ feeding, the slurry was stirred for 1 hour at 25° C. At this point, the precipitated solid was recovered by filtration, washed with 50 ml of MeOH, thrice with 100 ml of hexane and finally dried under vacuum. A spheroidal white solid were recovered, with an average particle size of 4 micron and a narrow particle size distribution (Span 1).

Elemental analysis showed that this product contained Mg, Ti, MeO and C$_2$H$_5$O (determined as ROH) in the molar ratio Mg/Ti/MeO/C$_2$H$_5$O of 1/0.51/4.58/0.19.

An amount of the so obtained precursor was reacted with EASC in hexane, using the following conditions: Cl/EtO=1.5 molar ratio; T=60° C.; t=1 h. Then the solid was recovered by filtration, washed twice with hexane and dried under vacuum. The so obtained catalyst was used in the homopolymerization of ethylene according to the general procedure A. The results are reported in table 1.

Example 2

To a four-necked flask with a stirrer, a reflux-cooler and a thermometer, kept in a inert gas atmosphere and containing 0.30 mol of THF(24.3 ml) and 200 ml of MeOH (4.95 mol), were slowly added, 0.30 mol of Mg. The dissolution of Mg in MeOH is highly exothermic, so the feeding of metallic Mg was so slow to maintain the temperature below 35° C. At the end, a solution was obtained.

At this point, 0.16 mol of Ti(OEt)$_4$ was slowly added to the solution in about 30 minutes, while maintaining the stirring speed at 400 rpm and observing the MgOEt$_2$ solution becoming opalescent with the formation of a precipitate. At the end of Ti(OEt)$_4$ feeding, the slurry was stirred for 1 hour at 25° C. At this point, the precipitated solid was recovered by filtration, washed with 50 ml of MeOH, thrice with 100 ml of hexane and finally dried under vacuum. A spheroidal white solid was recovered, with an average particle size of 17 micron and a narrow particle size distribution (Span 1.1).

Elemental analysis showed that this product contained Mg, Ti, MeO and C$_2$H$_5$O (determined as ROH) groups in the molar ratio Mg/Ti/MeO/C$_2$H$_5$O of 1/0.55/5.15/0.30.

The so obtained catalyst was used in the copolymerization of ethylene according to the procedure. The results are reported in table 1.

Example 3

To a four-necked flask with a stirrer, a reflux-cooler and a thermometer, kept in a inert gas atmosphere and containing 800 ml of MeOH and 400 ml of tolune, were slowly added, 1.52 mol of Mg. The feeding of metallic Mg was so slow to maintain the temperature below 35° C. At the end, a solution was obtained.

At this point, 0.84 mol of Ti(OEt)$_4$ was slowly added to the solution in about 60 minutes, while maintaining the stirring speed to 400 rpm and observing the MgOEt$_2$ solution becoming opalescent with the formation of a precipitate. At the end of Ti(OEt)$_4$ feeding, the slurry was stirred for 2 hour at 25° C. At this point, the precipitated solid was recovered by filtration, washed with MeOH, thrice with hexane and finally dried under vacuum. A spheroidal white solid were recovered, with an average particle size of 16 micron and a narrow particle size distribution (Span 0.76).

Elemental analysis showed that this product contained Mg, Ti, MeO and C$_2$H$_5$O (determined as ROH) in the molar ratio Mg/Ti/MeO/C$_2$H$_5$O of 1/0.45/5.70/0.16.

The so obtained catalyst precursor was used in the homopolymerization of ethylene according to procedure (C). The results are reported in table 1.

Example 4

About 10 g of the catalytic component of example 3, were introduced into a four-necked flask equipped with a stirrer, a reflux-cooler and a thermometer, kept in a inert gas atmosphere and containing 250 ml of TiCl$_4$ thermostated at −5° C. The temperature was slowly raised to room temperature and then raised at 1.5° C./min. to 130° C. At this temperature the suspension was stirred for 1 hour. Then the liquid was removed and fresh TiCl$_4$ (250 ml) was added at room temperature. The temperature was raised at 130° C. and the suspension was stirred at 130° C. for 0.5 hours. The solid was filtered, washed twice with hexane and vacuum dried. The so obtained catalyst was used in the homopolymerization of ethylene according to procedure (B). The results are reported in table 1.

Example 5

In a 0.5 liter reactor, kept under inert conditions, 12.0 g of the catalyst precursor of Example 3 were suspended in 300 ml of TiCl$_4$ cooled at 0° C. Under stirring the temperature was increased slowly to 40° C. and 2.8 g of 9,9-bis-methoxymethy-fluorene were added. The temperature was raised to 100° C., and the reaction mixture stirred at that temperature for 2 hours. After that, the stirrer was stopped and the liquid was removed by filtration. 300 ml of fresh TiCl$_4$ were added and the slurry stirred at 110° C. for 30 minutes. After that, stirring was discontinued and the liquid was removed by filtration. 300 ml of fresh TiCl$_4$ were added and the slurry stirred at 110° C. for 30 minutes. After that, stirring was discontinued and the liquid was removed by filtration. The solid was washed 5 times with hot hydrocarbon and dried under vacuum. The recovered solid, showed the following composition: Mg 15% wt, Ti 6.7% wt, 9,9-bis-methoxymethy-fluorene 7% wt. The so obtained catalyst was used in the homopolymerization of propylene according to procedures (I and II). The results are reported in table 2.

Comparative Example 6

A solution of Mg(OMe)$_2$ in methanol was obtained by carefully dissolving metallic Mg in an excess of MeOH. The solution was concentrated under stirring to precipitate a crystalline powder. Elemental analysis showed that this product contained Mg and MeO (determined as ROH) in the molar ratio Mg/MeO of 1/2.82.

12 g of so recovered solid was reacted with TiCl$_4$ in the presence of an internal donor using the same equipment and procedure as disclosed in Example 6.

The recovered solid, after titanation, showed the following composition: Mg 19.5% wt, Ti 2.4% wt, 9,9-bis-methoxymethy-fluorene 1.1% wt. The so obtained catalyst was used in the homopolymerization of propylene according to procedures (I). The results are reported in table 2.

TABLE 1

| | | | | Bulk | | | | |
|---|---|---|---|---|---|---|---|---|
| | | Activity | MIE | | Density | XS | Tm | density | C4⁻ |
| Example | Procedure | Kg/g | g/10' | F/E | g/cm³ | % | °C. | g/cm³ | % wt |
| 1 | A | 42.8 | 0.5 | 33.8 | 0.22 | | | | |
| 2 | COPO | 7.7 | 0.17 | 25.6 | | 5.9 | 121.6 | 0.9225 | 6.7 |
| 3 | C | 16 | 1.1 | 31.8 | 0.225 | | | | |
| 4 | B | 28.3 | 0.7 | 24.7 | 0.26 | | | | |

TABLE 2 polymerization of propylene

| Example | Procedure | Activity Kg/g | MIL | XI % | Bulk Density g/cm³ |
|---|---|---|---|---|---|
| 5 | I | 120 | 18.8 | 89 | 0.37 |
|   | II | 56.6 | 1.9 | 96 | 0.425 |
| Comp. 6 | I | 6 | — | — | — |

The invention claimed is:

1. Solid catalyst precursors comprising Mg, Ti, OMe and OR groups that are in molar ratios defined by formula $MgTi_n(OMe)_{(p)}(OR)_x$, wherein:
   n ranges from 0.1 to 1;
   p is $\geq(2+4n)$;
   x ranges from 0 to 1; and
   R is selected from $C_2$-$C_{15}$ hydrocarbon groups.

2. The solid catalyst precursors according to claim 1, wherein n ranges from 0.2 to 0.8.

3. The solid catalyst precursors according to claim 1, wherein p is >2+4n.

4. The solid catalyst precursors according to claim 1, wherein x is lower than 0.5.

5. The solid catalyst precursors according to claim 1, wherein R is selected from $C_2$-$C_{10}$ linear or branched alkyl groups.

6. A process for preparing solid catalyst precursors comprising Mg, Ti, OMe and OR groups that are in molar ratios defined by formula $MgTi_n(OMe)_{(p)}(OR)_x$, wherein:
   n ranges from 0.1 to 1;
   p is $\geq(2+4n)$;
   x ranges from 0 to 1; and
   R is selected from $C_2$-$C_{15}$ hydrocarbon groups;
the process comprising dissolving metallic Mg in an excess of methanol, optionally in presence of an inert medium, and then adding a compound of formula $Ti(OR)_4$ wherein R is selected from $C_2$-$C_{15}$ hydrocarbon groups, so that precipitation of the solid precursors takes place.

* * * * *